(12) United States Patent
Han et al.

(10) Patent No.: US 7,369,404 B2
(45) Date of Patent: May 6, 2008

(54) MOUNTING APPARATUS FOR STORAGE DEVICE

(75) Inventors: Shao-Bo Han, Shenzhen (CN); Hsuan-Tsung Chen, Tu-Cheng (TW); Wei-Bin Hua, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 301 days.

(21) Appl. No.: 11/322,066

(22) Filed: Dec. 29, 2005

(65) Prior Publication Data
US 2006/0209508 A1    Sep. 21, 2006

(30) Foreign Application Priority Data
Mar. 19, 2005    (CN) .................... 2005 2 0056119

(51) Int. Cl.
*G06F 1/16*    (2006.01)
(52) U.S. Cl. ................ 361/685; 360/98.08; 439/157; 720/655
(58) Field of Classification Search .......... 360/97.01, 360/98.08, 99.04; 312/223.1, 223.6; 439/79, 439/157; 720/652, 655; 361/679–687, 724–727
See application file for complete search history.

(56) References Cited

U.S. PATENT DOCUMENTS

| | | | |
|---|---|---|---|
| 5,227,954 A | 7/1993 | Twigg | 361/685 |
| 5,510,955 A | 4/1996 | Taesang | 361/685 |
| 6,956,737 B2 * | 10/2005 | Chen et al. | 361/685 |
| 2006/0279918 A1 * | 12/2006 | Shi et al. | 361/683 |
| 2007/0153469 A1 * | 7/2007 | Chen et al. | 361/685 |

* cited by examiner

*Primary Examiner*—Hung Van Duong
(74) *Attorney, Agent, or Firm*—Morris Manning Martin LLP; Tim Tingkang Xia, Esq.

(57) ABSTRACT

A mounting apparatus for holding a storage device (10) defining apertures (122) in sidewalls (12) thereof includes a bracket (20), and a cover (30) rotatably attached to the bracket, and a pair of thumbscrews (40) securing the cover to the bracket. The bracket includes a first side plate (23) with a plurality of tips (231) engaging in the apertures, and a second side plate (24). The second side plate defines a cutout (25) and a pair threaded holes (247) therein. The cover is pivotally attached to the second plate and covers the cutout. The cover includes a plurality of tips (33) to engage in corresponding apertures of the storage device, and a pair of through holes (37). The thumbscrews extend through the through holes and engage in the threaded holes.

18 Claims, 3 Drawing Sheets

MOUNTING APPARATUS FOR STORAGE DEVICE

BACKGROUND OF THE INVENTION

1. Field of the Invention

The present invention relates to mounting apparatuses, and more particularly to a mounting apparatus for a storage device.

2. General Background

An electronic apparatus, such as a typical desktop computer, a tower computer, a server, and the like, usually includes storage devices, such as hard disk drives, compact disk read-only memory (CD-ROM) drives, digital video disc (DVD) drives, floppy disk drives, and the like. These devices are typically added to increase the functionality of the electronic apparatus as desired by a user. However, the installation of such devices in the electronic apparatus is always labor-intensive.

The installation of a hard disk drive in a computer typically involves use of screws to attach the hard disk drive to a bracket of a computer chassis. Usually, these screws are small enough to make them difficult to be manipulated and installed. It is laborious and time-consuming to manually manipulate the screws. Additionally, because of their small size, the screws are easier to be dropped by an assembler into the computer. Some accidental damage will occur in the computer due to impact of these moving parts, and the like causes.

To address the aforementioned problems, a plurality of mounting apparatuses is invented to reduce the number of needed screws. For example, a pair of detachable rails is attached to opposite sides of a storage device with screws. The storage device slides into and is secured to a drive bracket. However, the screws have to be removed to detach the rails from the storage device before replacing the storage device.

What is desired, therefore, is a mounting apparatus which conveniently and securely holds a storage device in a bracket.

SUMMARY

In one preferred embodiment, a mounting apparatus for holding a storage device defining apertures in sidewalls thereof includes a bracket, and a cover rotatably attached to the bracket, and a pair of thumbscrews securing the cover to the bracket. The bracket includes a first side plate with a plurality of tips engaging in the apertures, and a second side plate. The second side plate defines a cutout and a pair threaded holes therein. The cover is pivotally attached to the second plate and covers the cutout. The cover includes a plurality of tips to engage in corresponding apertures of the storage device, and a pair of through holes. The thumbscrews extend through the through holes and engage in the threaded holes.

Other advantages and novel features will become more apparent from the following detailed description of preferred embodiments when taken in conjunction with the accompanying drawings, in which:

DETAILED DESCRIPTION OF THE EMBODIMENT

Figure 1:
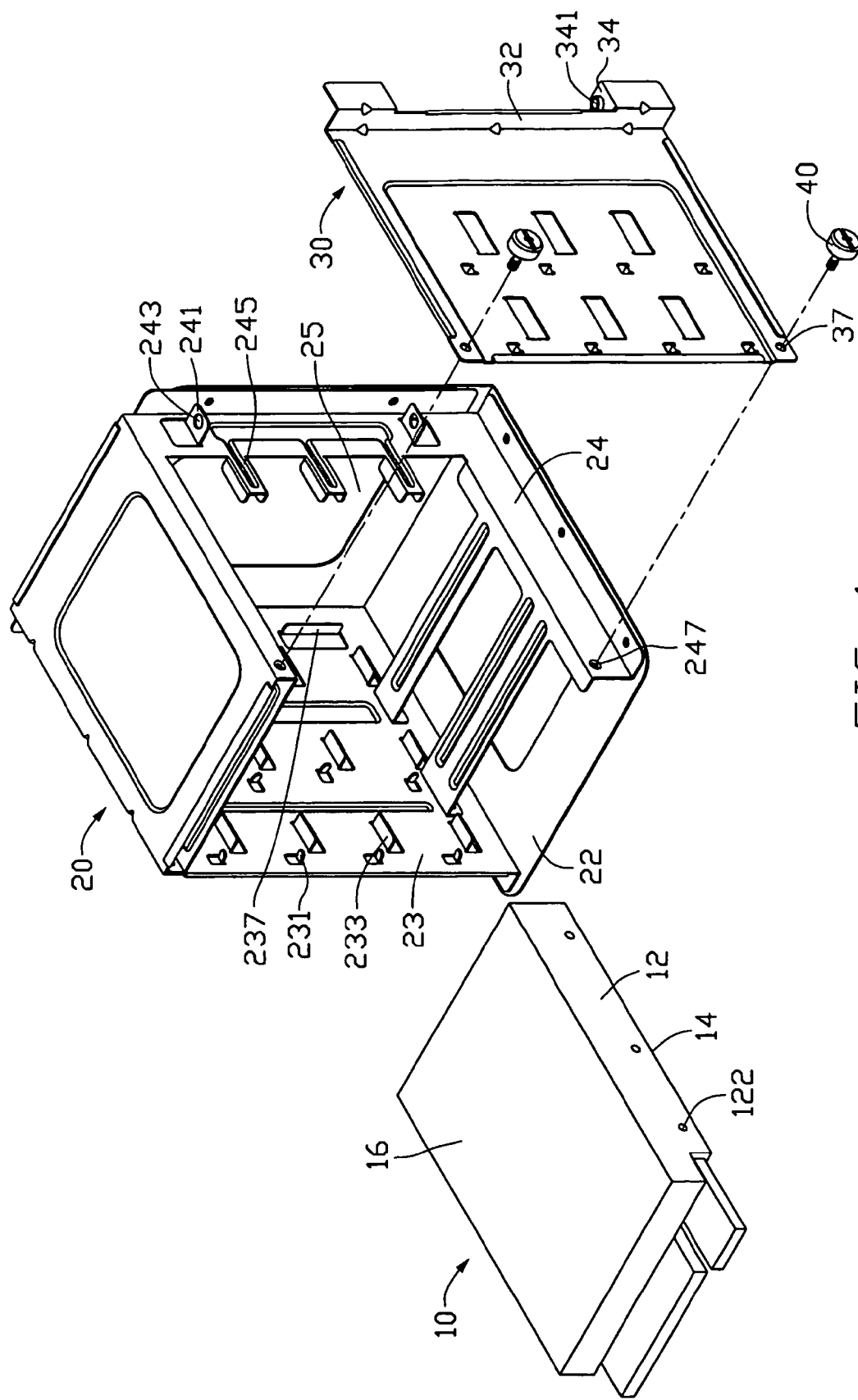
FIG. 1 is an exploded, isometric view of a mounting apparatus in accordance with a preferred embodiment of the present invention.

Referring to FIG. 1, in a preferred embodiment of the invention, a mounting apparatus of an electronic apparatus like a computer is provided for holding a functional device like a storage device 10 of the computer in place. The mounting apparatus includes a bracket 20, a cover 30 pivotally attached to the bracket 20, and a pair of fasteners 40. Each of the fasteners 40 is a thumbscrew.

The storage device 10 is mounted in the bracket 20, and includes a pair of sidewalls 12 defining a plurality of apertures 122, a top wall 16, and a bottom wall 14.

The bracket 20 includes a base plate 22, a first side plate 23, and a second side plate 24. The first plate 23 and the second plate 24 are parallel to each other and separately perpendicular to the base plate 22. The first plate 23 includes a plurality of tips 231, and a plurality of supporting tabs 233 extending inwardly therefrom. The tips 231 are for extending into the corresponding apertures 122 of the sidewalls 12 of the storage device 10. The supporting tabs 233 are for guiding and supporting the bottom wall 14 and top wall 16 of the storage device 10. A vertical tab 237 extends perpendicularly from a rear portion of the first plate 23, for locating the storage device 10 in a predetermined position in the bracket 20. A cutout 25 is defined in the second plate 24. A threaded hole 247 is respectively defined in an upper portion and a lower portion of the second plate 24 beside the cutout 25. A pair of spaced first connecting tabs 241 extends outwardly and perpendicularly from a rear portion of the second plate 24, beside the cutout 25. A pivoting hole 243 is defined in each first connecting tab 241. A plurality of supporting beams 245 extrudes from a rear side of the cutout 25 into the cutout 25, parallel to the base plate 22.

Figure 2:
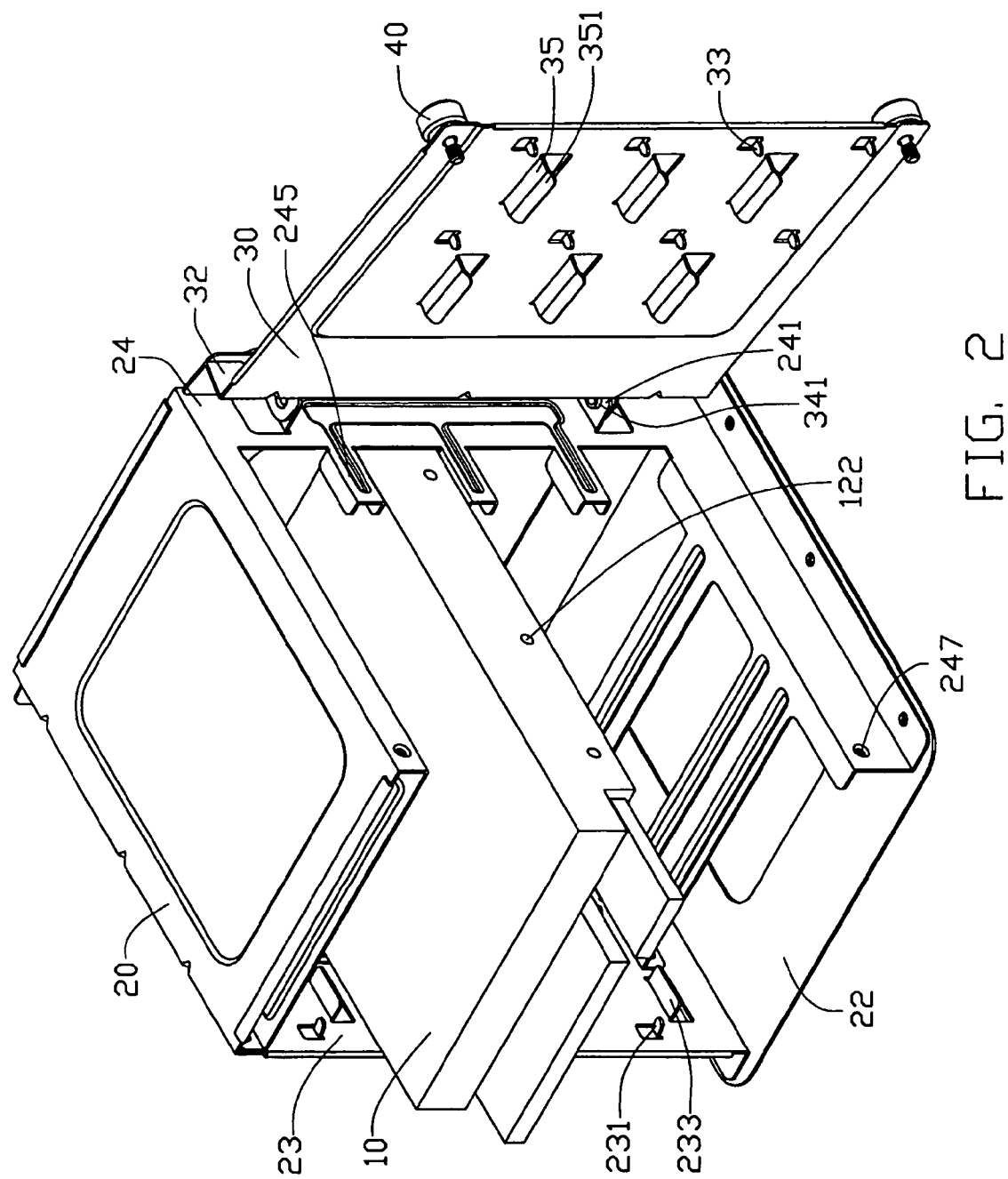
FIGS. 2 and 3 are assembled views of FIG. 1, respectively schematically showing the mounting apparatus in different working states.

Referring also to FIG. 2, the cover 30 is for covering the cutout 25 of the bracket 20. The cover 30 has similar configuration to the first plate 23 of the bracket 20. The cover 30 includes a plurality of tips 33, and a plurality of supporting tabs 35 extending perpendicularly therefrom, for engaging with the storage device 10. A guiding slope 351 extends from an outer edge of each supporting tab 35. An L-shaped flange 32 extends perpendicularly from a rear edge of the cover 30. A pair of spaced second connecting tabs 34 extends perpendicularly to the flanges 32. A post 341 extends perpendicularly from each of the second connecting tabs 341, for pivotally engaging in the pivoting hole 243 of the bracket 20.

Figure 3:
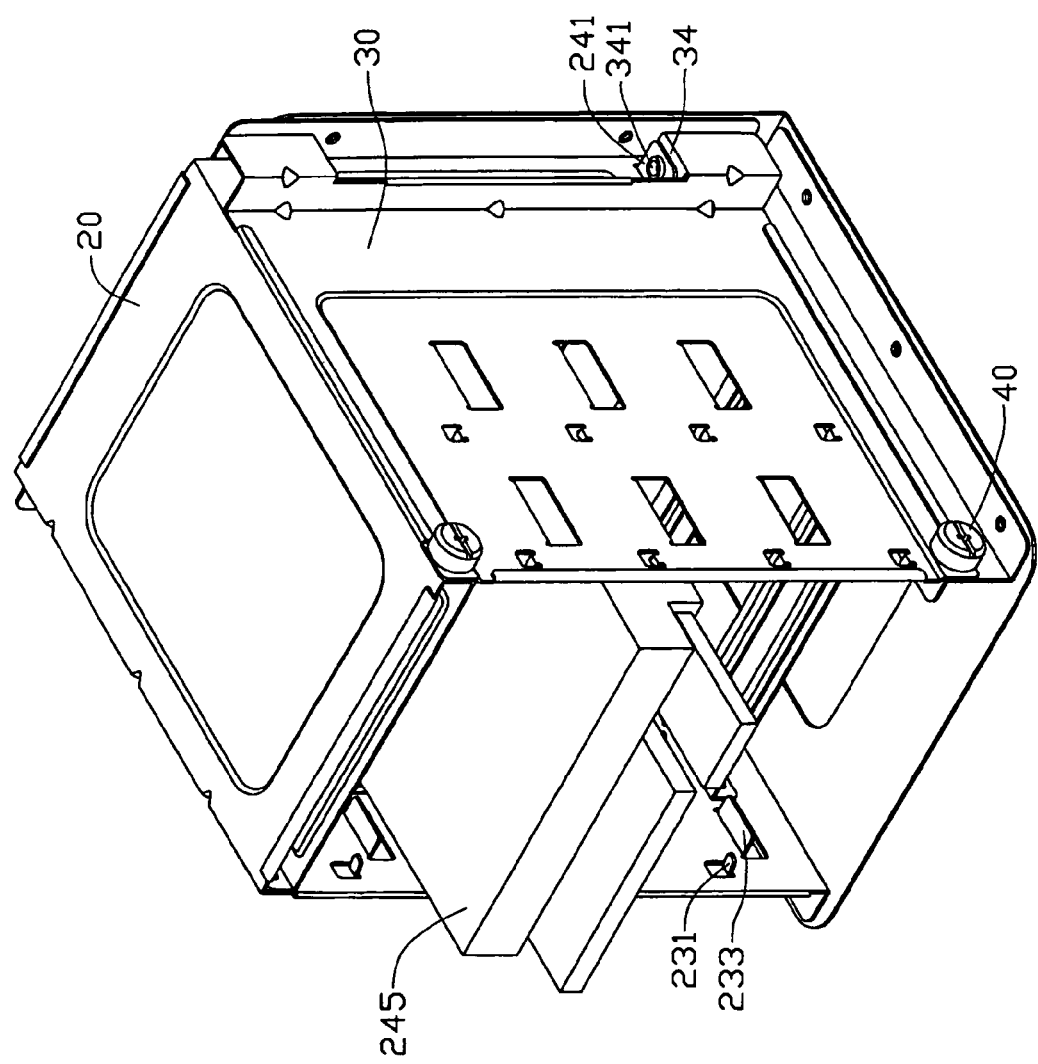

Referring also to FIG. 3, in assembly, the cover 30 is pivotally attached to the second side plate 24 of the bracket 20, with the posts 341 rotatably received in the pivoting holes 243 of the bracket 20. The storage device 10 is put into the bracket 20 until the vertical tab 237 engages the storage device 10, with the bottom wall 14 and the top wall 16 thereof sliding along the supporting tabs 233 and the supporting beams 25 of the bracket 20. Then the storage device 10 is moved toward the first plate 23 of the bracket 20, with tips 231 extending into the correspond apertures 122 of the storage device 10. The cover 30 is rotated to cover the second plate 24 of the bracket 20. The tips 33 of the cover 30 extend into the corresponding apertures 122 of the storage device 10 and the supporting tabs 35 of the cover 30 engages the bottom wall 14 of the storage device via the guiding slopes 351. The fasteners 40 are extended through the through holes 37 of the cover 30 to engage in the threaded holes 247 of the bracket 20. The storage device 10 is secured in the bracket 20.

To detach the storage device 10 from the bracket 20, the fasteners 40 are unscrewed from the threaded holes 247 of the second side plates 24 of the bracket 20. The cover 30 is rotated away from the second side plate 24. The storage device 10 is easily taken out from the bracket 20, with the tips 231 and 33 disengaging from the apertures 122 of the storage device 10.

It is believed that the present embodiment and its advantages will be understood from the foregoing description, and apparent that various changes may be made thereto without departing from the spirit and scope of the invention or sacrificing its advantages, the example hereinbefore described merely being preferred embodiment.

What is claimed is:

1. A mounting apparatus for a storage device, the storage device defining a plurality of apertures in sidewalls thereof, the mounting apparatus comprising:
    a bracket comprising a first side plate, and second side plate parallel to the first side plate, the second side plate defining a cutout and at least one threaded hole therein;
    a cover pivotally attached to the bracket and covering the cutout, the cover comprising a plurality of tips for engaging in the apertures of the storage device, and at least one through hole defined therein; and
    at least one fastener extending through said through hole to engage in said threaded hole.

2. The mounting apparatus as claimed in claim 1, wherein said fastener is a thumbscrew.

3. The mounting apparatus as claimed in claim 1, wherein the second side plate comprises at least one first connecting tab defining a pivoting hole therein, the cover comprises at least one second connecting tab with a post, the post is rotatably received in the pivoting hole.

4. The mounting apparatus as claimed in claim 1, wherein the cover further comprises a plurality supporting tabs for supporting and guiding the storage device.

5. The mounting apparatus as claimed in claim 4, wherein each of the supporting tabs further comprises a guiding slope extending therefrom.

6. The mounting apparatus as claimed in claim 1, wherein the first side plate of the bracket comprises a plurality of supporting tabs for guiding and supporting the storage device.

7. The mounting apparatus as claimed in claim 1, wherein the first side plate of the bracket comprises a plurality of tips for engaging in the apertures of the storage device.

8. The mounting apparatus as claimed in claim 1, wherein the first side plate of the bracket comprises a vertical tab for locating the storage device in a predetermined position therein.

9. The mounting apparatus as claimed in claim 1, wherein the second side plate further comprises a plurality of supporting beams extending into the cutout.

10. A mounting apparatus assembly comprising:
    a bracket comprising a first side plate;
    a storage device slidably accommodated in the bracket; and
    a cover having one side rotatably attached to the bracket, and the other side detachably secured to the bracket, the cover acting as a second side plate opposing to the first side plate; wherein
    the cover forming a plurality of engaging means to restrict the storage device in the bracket.

11. The mounting apparatus assembly as claimed in claim 10, wherein the storage device defining a plurality of apertures in sidewalls thereof, the engaging means comprises a plurality of tips stamped from the cover to engaging in the apertures.

12. The mounting apparatus assembly as claimed in claim 10, wherein the bracket further comprises a second side plate parallel to the first side plate, the second side plate defines a cutout therein, the cover covers on the cutout.

13. The mounting apparatus assembly as claimed in claim 12, wherein the cover comprises at least one through hole defined therein, the second side plate of the bracket defines at least one threaded hole therein, a fastener extends through the at least one through hole and engages in said threaded hole.

14. The mounting apparatus assembly as claimed in claim 12, wherein the second side plate comprises at least one first connecting tab defining a pivoting hole therein, the cover comprises at least one second connecting tab with a post, the post is rotatably received in the pivoting hole.

15. The mounting apparatus assembly as claimed in claim 10, wherein the cover comprises a plurality of supporting tabs performed as one of the plurality of engaging means, each of the supporting tabs further comprises a guiding slope formed and extending therefrom.

16. The mounting apparatus assembly as claimed in claim 10, wherein the first side plate of the bracket comprises a vertical tab for locating the storage device in a predetermined position thereof.

17. An electronic apparatus comprising:
    a removable device installable in said electronic apparatus for function extension thereof;
    a bracket defining a space therein for accommodating said device, and configured to allow said device to move into said space along at least two directions different from each other; and
    a cover movably attachable to said bracket at a side thereof so as to cover said side of said bracket and block entrance of said device into said space along at least one of said at least two directions, said cover capable of supporting and positioning said device in said space together with said bracket when said device resides in said space and said cover moves to abut against said side of said bracket.

18. The electronic apparatus as claimed in claim 16, wherein said device is partially movable through said side of said bracket to enter said space along each of said at least two directions.

* * * * *